(12) United States Patent
Bollenbacher et al.

(10) Patent No.: US 9,286,893 B2
(45) Date of Patent: Mar. 15, 2016

(54) PRE-PROCESSED ANNOTATION OF STREET GRAMMAR IN SPEECH ENABLED NAVIGATION SYSTEMS

(75) Inventors: Rick E. Bollenbacher, Boca Raton, FL (US); Samuel L. Karns, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1250 days.

(21) Appl. No.: 12/130,934

(22) Filed: May 30, 2008

(65) Prior Publication Data

US 2009/0299749 A1  Dec. 3, 2009

(51) Int. Cl.
G10L 15/00 (2013.01)
G10L 15/04 (2013.01)
G10L 15/19 (2013.01)
G10L 15/08 (2006.01)

(52) U.S. Cl.
CPC ............... *G10L 15/19* (2013.01); *G10L 15/08* (2013.01)

(58) Field of Classification Search
None
See application file for complete search history.

(56) References Cited

U.S. PATENT DOCUMENTS 6,108,631 A * 8/2000 Ruhl ............................. 704/270
6,230,132 B1 * 5/2001 Class et al. .................... 704/270
6,598,016 B1 * 7/2003 Zavoli et al. .................. 704/251
6,621,452 B2 * 9/2003 Knockeart et al. ....... 342/357.31
6,708,150 B1 * 3/2004 Hirayama et al. ............. 704/243
7,657,368 B2 * 2/2010 Weiss et al. ................... 701/200
7,983,913 B2 * 7/2011 Seltzer et al. ................. 704/251

OTHER PUBLICATIONS

Scansoft "OpenSpeech DialogModules Address Recognition". White Paper 05/05 on SpeechWorks Solutions from Scansoft, p. 1-14, 2005.*

* cited by examiner

*Primary Examiner* — Jesse Pullias
(74) *Attorney, Agent, or Firm* — Steven M. Greenberg, Esq.; CRGO Law

(57) ABSTRACT

Embodiments of the present invention address deficiencies of the art in respect to virtualization and provide a novel and non-obvious method, system and computer program product for annotation of street grammar in speech enabled navigation devices. In an embodiment of the invention, a pre-processing street grammar annotation system can be provided. The system can include an annotated street grammar storage that contains street root names wherein each street root name has more than one street suffix associated with said street root name, and a street annotation pre-processor wherein the street annotation pre-processor contains logic enabled to annotate a set of street suffixes to a street root name prior to processing a voice input in a speech enabled navigation device, wherein the street root name has more than one street suffix associated with said street root name.

5 Claims, 3 Drawing Sheets

| Input 310 | Annotated Grammar 320 |
|---|---|
| Beachwood | Beachwood + [Street ~ St ~ Terrace ~ Ter ~ Avenue ~ Ave] |
| Beachwood Street | Beachwood St |
| Beachwood Terrace | Beachwood Ter |
| Beachwood Avenue | Beachwood Ave |
| Beckford | Beckford + [Place ~ Pl ~ Lane ~ Ln] |
| Beckford Place | Beckford Pl |
| Beckford Lane | Beckford Ln | ated suffixes associated with a given street root name.

PRE-PROCESSED ANNOTATION OF STREET GRAMMAR IN SPEECH ENABLED NAVIGATION SYSTEMS

BACKGROUND OF THE INVENTION

1. Field of the Invention

The present invention relates to the field of navigation devices and more particularly to annotation of street grammars in speech enabled navigation devices.

2. Description of the Related Art

Over the years, various navigation devices have been developed. More recently, speech recognition technology in vehicle navigation systems have been developed to eliminate the time-consuming task of keying in street or city names by allowing users to simply speak a destination. Some navigation devices receive voice input of destination elements in a particular order such as state, city, street name along with the street suffix name (avenue, terrace, place etc.). In the case of such navigation devices, the user is required to say the street suffix name in conjunction with the street name 'root' in order to be navigated to the desired destination.

A common issue however in speech enabled navigation devices is when users often leave out the street suffix names. The drawback in current navigation devices is that usually the system expects the user to state the suffix for a given street name. However, it is often found that users don't really know which suffixes are even possible for a given street but their memories could be ideally triggered with just a short list of valid suffixes if it were possible to present a set of possible valid suffixes to the user.

Another drawback is that the user is prompted to repeat both the street name and the street suffix name together to confirm a desired destination. There is no way for the user to say a street name alone, and then have the navigation device ask for only a suffix name that can be annotated to the street name, eliminating the need to have the user repeat the street name again along with a suffix name. Thus, an annotated street grammar to include possible street name suffixes annotated to a given street is desired.

BRIEF SUMMARY OF THE INVENTION

Embodiments of the present invention address deficiencies of the art in respect to virtualization and provide a novel and non-obvious method, system and computer program product for annotation of street grammar in speech enabled navigation devices. In an embodiment of the invention, a pre-processing street grammar annotation system can be provided. The system can include an annotated street grammar storage that contains street root names wherein each street root name has more than one street suffix associated with said street root name, and a street annotation pre-processor wherein the street annotation pre-processor contains logic enabled to annotate a set of street suffixes to a street root name prior to processing a voice input in a speech enabled navigation device, wherein the street root name has more than one street suffix associated with said street root name.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for pre-processed annotation of street grammar for a speech enabled navigation device. In accordance with an embodiment of the present invention, a street grammar of street root names can be annotated with street suffixes during pre-processing to produce an annotated street grammar. Subsequently, the annotated street grammar can be used to prompt a speaker to select from a set of suffixes associated with a spoken street root name without requiring the speaker to repeat the street root name itself. Thus, the user is not required to repeat the street root name when asked by the navigation device to confirm a suffix, and also is able to chose from a set of valid pre-processed annotated suffixes associated with a given street root name.

Figure 1:
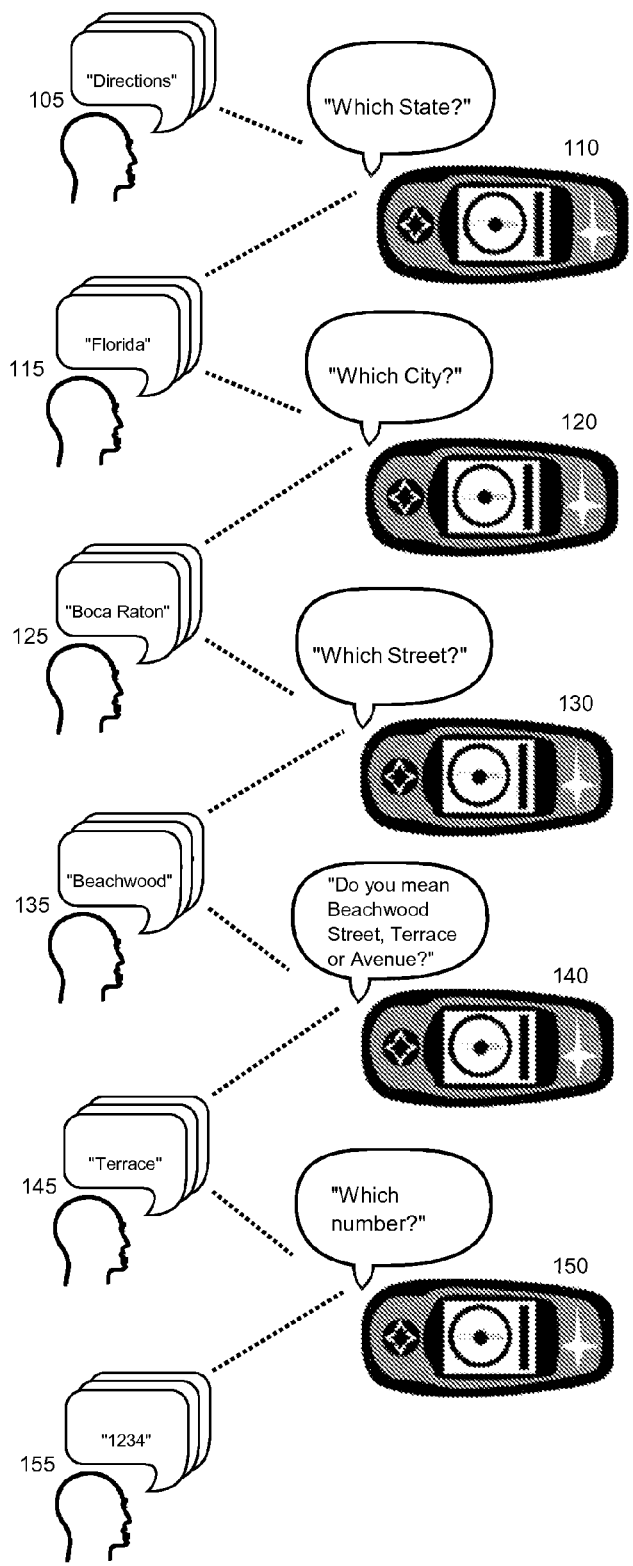
FIG. 1 is a pictorial illustration of an implementation of the speech recognition process that utilizes annotation of street grammar in a speech enabled navigation device.

In further illustration, FIG. 1 is a pictorial illustration of dialogue between a user and the speech enabled navigation device that utilizes pre-processed annotation of street grammar. As shown in FIG. 1, a user starts the speech recognition process by audibly asking for directions 105 in which the speech recognition processor in the speech enabled navigation device can audibly prompt the user to specify a state 110. The user can specify a state 115 for instance, "Florida" and the navigation device can then prompt the user to specify a city, such as "Boca Raton" within the specified state 120. After the user specifies the city 125, the navigation device can prompt the user to specify a street 130. Very often users leave out the suffix part of a street address. At this point, as seen in this illustration, the user can only say the street name 135, such as "Beachwood" without any suffix. Instead of returning an error for saying an incomplete street address, the navigation device can return to the speech recognition processor the street name recognized as the root (if that is all that is spoken by the user), and deliver an array of annotated valid suffixes associated with the given street root.

Thus, the navigation device can prompt the user to select a street suffix from a set of street suffixes associated that were already annotated to the given street name 140 in the pre-processing step of street grammar compilation. Next the user can simply specify the street suffix 145, such as "Terrace", without having to repeat the street root, "Beachwood" again. Finally the navigation device can ask the street number 150 after recognizing the given suffix from the annotated set of suffixes associated with the street name. The user can then specify the street number 155 and the navigation device proceed to render navigational instructions to the user.

Figure 2:
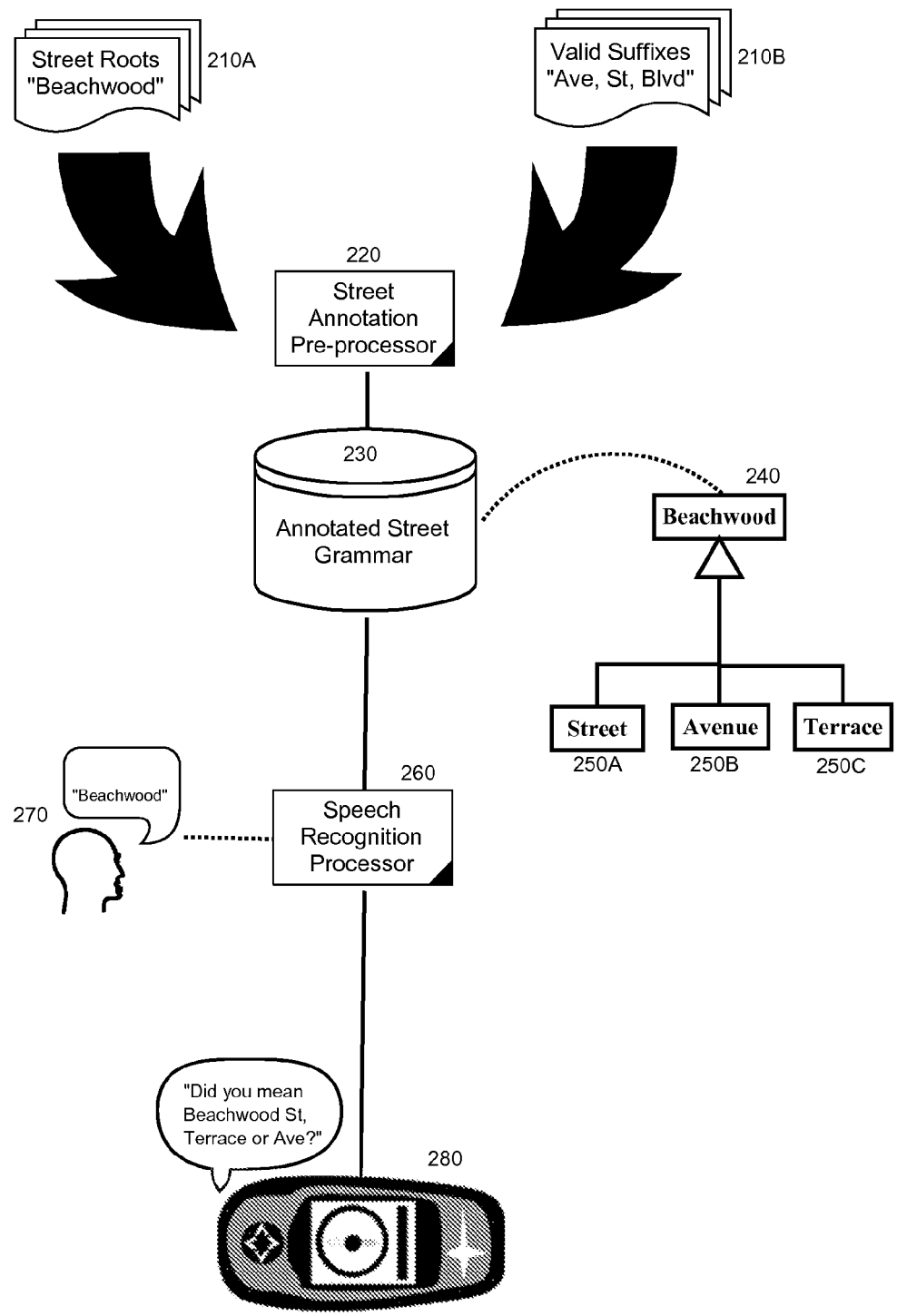
FIG. 2 is a schematic illustration of an annotated pre-processing street grammar system in a speech enabled navigation device.

FIG. 2 is a schematic illustration of an annotated pre-processing street grammar system in a speech enabled navigation device. As shown in FIG. 2, street grammars 210A such as a street root "Beachwood" can be annotated to include a set of associated suffixes 210B such as "Ave.", "St.", and "Blvd" so that the street grammars are pre-compiled prior to delivery by the street annotation pre-processor 220. The pre-processor can run off-line during an application build process, merging street root names with associated suffixes into an annotated street grammar database 230. The database can house the compiled grammars so that a street root name such as "Beachwood" can be annotated to include associated suffixes. Each root name 240 in the annotated street grammar database can have several suffix entries such as street 250A, avenue 250B, and terrace 250C annotated to the root name 240 entry.

A speech recognition processor 260 can be coupled to the annotated street grammar database 230. When a user 270 audibly inputs a street root such as "Beachwood", the speech recognition processor can extract the corresponding annotated street suffixes 250A, 250B, 250C associated with the street root 240. The navigation device 280 can then ask the user to select from a set of associated suffixes which suffix the user would like. The navigation device identifies the next voice input as the street suffix requested from the user and extracts the annotated street grammar that includes the street root and selected suffix by the user.

Notably, the pre-processing of the grammars can be done outside of the navigation device. The grammars can be part of a shipped product (along with the speech recognition application), thus the pre-processing that does the annotation can be implemented "at the factory".

Figures 3, 4:
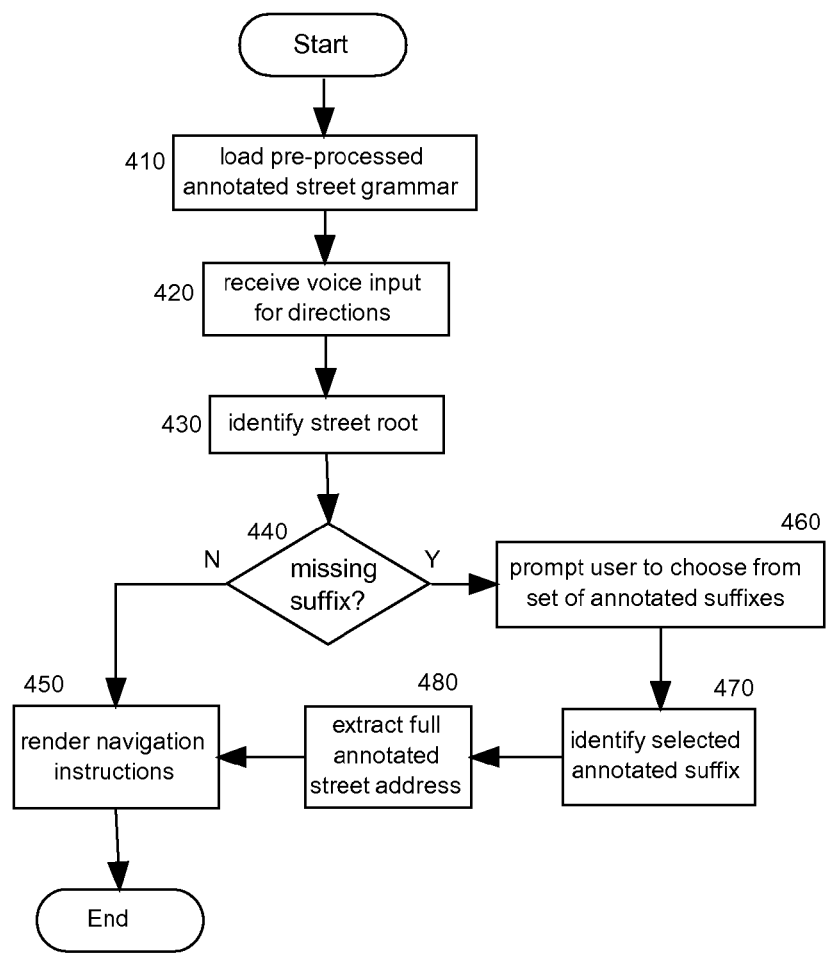
FIG. 3 is a table illustrating annotated street grammar created by the street annotation pre-processor of FIG. 2.
FIG. 4 is a flow chart illustrating a process for the pre-processing street grammar annotation system of FIG. 2.

In further illustration, FIG. 3 is a table illustrating annotated street grammar created by the street annotation pre-processor of FIG. 2. As shown in FIG. 3, the input column 310 represents voice inputs from the user that corresponds to the annotated grammar column 320. The street annotation pre-processor can enable a grammar built dynamically after the recognition of the street root that can include the full annotated street address which can contain the street root plus entries for each of the suffixes.

FIG. 4 is a flow chart illustrating a process implementing the pre-processing street grammar annotation system of FIG. 2. As shown in FIG. 4, the speech recognition processor can load the pre-processed annotated street grammar in step 410. Then in step 420 the system can receive voice input for directions by the user. In step 430 the system can identify the street name and in decision step 440 the system can determine whether the spoken voice input is missing a suffix. If not, then the system can render navigational instructions to the user in step 450. If the user has left out the suffix to a street name, then in step 460 the system can prompt the user to choose from a set of annotated suffixes. After the speech recognition identifies the selected suffix in step 470, the system can extract the full annotated street address in step 480. Finally, in step 450, the system can render navigational instructions to the user.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for annotation of street grammar in speech enabled navigation devices comprising:
constructing an annotated street grammar, by a street annotation pre-processor, by annotating a street root name with a set of street suffixes prior to processing a voice navigation input in a speech enabled navigation device;
loading the annotated street grammar by a speech recognition processor;
receiving a voice navigation input specifying a street name from a user;
determining whether the street name is missing a suffix; and
upon determining both that the street name is missing the suffix and also that the street name has more than one street suffix associated with the street name, prompting the user to select a street suffix by providing, to the user, the set of street suffixes associated with the street name based on the annotated street grammar.

2. The method of claim 1 wherein annotating the street root name with the set of street suffixes comprises merging the street root name with one or more street suffixes into an annotated street grammar storage.

3. A speech enabled navigation device comprising:
a street annotation pre-processor containing logic enabled to construct an annotated street grammar by annotating a street root name with a set of street suffixes prior to processing a voice navigation input;
an annotated street grammar storage coupled to the street annotation pre-processor, the annotated street grammar storage contains street root names wherein each street root name has more than one street suffix associated with said street root name; and a speech recognition processor for
loading the annotated street grammar;
receiving a voice navigation input specifying a street name from a user;
determining whether the street name is missing a suffix; and
upon determining both that the street name is missing the suffix and also that the street name has more than one street suffix associated with the street name, prompting the user to select a street suffix by providing, to the user, the set of street suffixes associated with the street name based on the annotated street grammar.

4. A computer program product comprising a non-transitory computer usable storage medium embodying computer usable program code for constructing street grammar, the computer program product comprising computer usable program code for:

constructing an annotated street grammar, by a street annotation pre-processor, by annotating a street root name with a set of street suffixes prior to processing a voice navigation input in a speech enabled navigation device;
loading the annotated street grammar by a speech recognition processor;
receiving a voice navigation input specifying a street name from a user;
determining whether the street name is missing a suffix; and
upon determining both that the street name is missing the suffix and also that the street name has more than one street suffix associated with the street name, prompting the user to select a street suffix by providing, to the user, the set of street suffixes associated with the street name based on the annotated street grammar.

5. The computer program product of claim 4, wherein the computer usable program code for annotating the street root name with the set of street suffixes comprises merging the street root name with one or more street suffixes into an annotated street grammar storage.

\* \* \* \* \*